US012602273B2

(12) United States Patent
Aneja et al.

(10) Patent No.: US 12,602,273 B2
(45) Date of Patent: Apr. 14, 2026

(54) SAFETY MONITORING OF A SYSTEM-ON-A-CHIP

(71) Applicant: QUALCOMM Incorporated, San Diego, CA (US)

(72) Inventors: Amit Aneja, Chandler, AZ (US); Vasant Kumar Easwaran, Frisco, TX (US); Rahul Gulati, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 168 days.

(21) Appl. No.: 18/489,809

(22) Filed: Oct. 18, 2023

(65) Prior Publication Data

US 2024/0134730 A1    Apr. 25, 2024
US 2024/0231982 A9    Jul. 11, 2024

Related U.S. Application Data

(60) Provisional application No. 63/380,083, filed on Oct. 19, 2022.

(51) Int. Cl.
*G06F 11/07*          (2006.01)

(52) U.S. Cl.
CPC ........ *G06F 11/0745* (2013.01); *G06F 11/079* (2013.01); *G06F 11/0793* (2013.01)

(58) Field of Classification Search
CPC . G06F 11/0745; G06F 11/079; G06F 11/0793
See application file for complete search history.

(56) References Cited

U.S. PATENT DOCUMENTS

| | | | | |
|---|---|---|---|---|
| 11,204,837 B2 * | 12/2021 | Lee | ..................... | G06F 13/1668 |
| 2017/0359241 A1 | 12/2017 | Takada et al. | | |
| 2018/0152472 A1 | 5/2018 | Amano et al. | | |
| 2018/0370540 A1 | 12/2018 | Yousuf et al. | | |
| 2019/0039644 A1 * | 2/2019 | Bernon-Enjalbert | ........................ | |
| | | | | B62D 5/0493 |
| 2020/0207374 A1 | 7/2020 | Li | | |
| 2021/0182139 A1 * | 6/2021 | Gurumurthi | ........ | G06F 11/0772 |
| 2022/0200843 A1 * | 6/2022 | Thor | ..................... | H04L 67/535 |

(Continued)

OTHER PUBLICATIONS

International Search Report and Written Opinion—PCT/US2023/077267—ISA/EPO—May 7, 2024.

(Continued)

*Primary Examiner* — Jigar P Patel
(74) *Attorney, Agent, or Firm* — Patterson & Sheridan LLP

(57)          ABSTRACT

Aspects of the present disclosure provide techniques and apparatus for safety monitoring of a vehicle control system. An example method of operating a vehicle includes detecting an error associated with a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs; indicating the error to the one or more ECUs via at least one of the first bus, the second bus, or a power management integrated circuit (PMIC) in response to detecting the error, wherein the PMIC is configured to supply power to the main domain or the safety domain; and performing one or more actions in response to detecting the error.

30 Claims, 4 Drawing Sheets

(56)     References Cited

U.S. PATENT DOCUMENTS

2022/0253358  A1       8/2022   Meunier et al.
2022/0326743  A1*   10/2022   Kraft ................... B60R 16/0239

OTHER PUBLICATIONS

Partial International Search Report—PCT/US2023/077267—ISA/
EPO—Feb. 8, 2024.

* cited by examiner

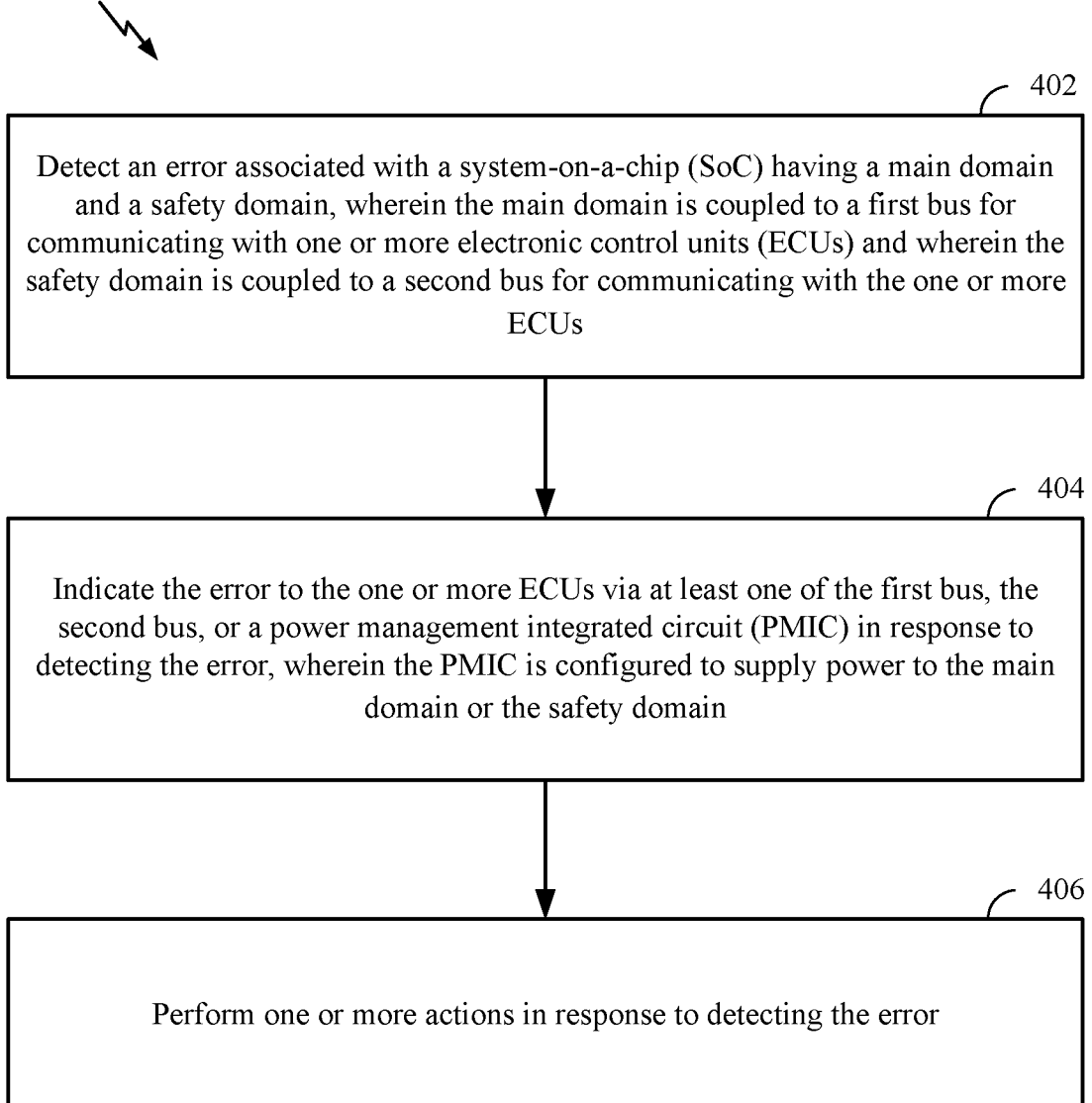

400

402

Detect an error associated with a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs

404

Indicate the error to the one or more ECUs via at least one of the first bus, the second bus, or a power management integrated circuit (PMIC) in response to detecting the error, wherein the PMIC is configured to supply power to the main domain or the safety domain

406

Perform one or more actions in response to detecting the error

FIG. 4

SAFETY MONITORING OF A SYSTEM-ON-A-CHIP

CROSS-REFERENCE TO RELATED APPLICATION(S)

The present application claims the benefit of and priority to U.S. Provisional Application No. 63/380,083, filed Oct. 19, 2022, which is expressly incorporated by reference herein in its entirety as if fully set forth below and for all applicable purposes.

BACKGROUND

Field of the Disclosure

Certain aspects of the present disclosure generally relate to electronic components, and more particularly to safety monitoring in vehicle control systems.

Description of Related Art

Over the past several years, the automobile has been transformed from a self-propelled mechanical vehicle into a powerful and complex electro-mechanical system that includes a large number of sensors and processors that control many of the vehicle's functions, features, and operations. Vehicles may be equipped with a vehicle control system, which may be configured to collect and use information from the vehicle's various systems and sensors to automate all or a portion of the vehicle's operations. For example, an Advanced Driver Assistance System (ADAS) may automate, adapt, or enhance the vehicle's operations. The ADAS may use information collected from the sensors (e.g., accelerometer, radar, lidar, geospatial positioning, etc.) to automatically detect a potential road hazard, and assume control over all or a portion of the vehicle's operations (e.g., braking, steering, etc.) to avoid detected hazards. Features and functions commonly associated with an ADAS include adaptive cruise control, automated lane detection, lane departure warning, automated steering, automated braking, and automated collision avoidance. The vehicle monitors for errors associated with the control system, and the vehicle may notify the operator of such errors, shut down certain systems, or operate in a degraded state in response to detecting certain errors.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide the advantages described herein.

Certain aspects of the present disclosure provide a method of operating a vehicle. The method generally includes detecting an error associated with a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs. The method further includes indicating the error to the one or more ECUs via at least one of the first bus, the second bus, or a power management integrated circuit (PMIC) in response to detecting the error, wherein the PMIC is configured to supply power to the main domain or the safety domain. The method also includes performing one or more actions in response to detecting the error.

Certain aspects of the present disclosure provide an apparatus for operating a vehicle. The apparatus generally includes a SoC and a PMIC. The SoC has a main domain and a safety domain, wherein the main domain is coupled to a first bus for communicating with one or more ECUs and wherein the safety domain is coupled to a second bus for communicating with the one or more ECUs. The PMIC is configured to supply power to the main domain or the safety domain. At least one of the SoC or the PMIC is configured to detect an error associated with the SoC, indicate the error to the one or more ECUs via at least one of the first bus, the second bus, or the PMIC in response to detecting the error, and perform one or more actions in response to detecting the error.

Certain aspects of the present disclosure provide an apparatus for operating a vehicle. The apparatus generally includes: means for detecting an error associated with a SoC having a main domain and a safety domain, wherein the main domain is coupled to a first bus for communicating with one or more ECUs and wherein the safety domain is coupled to a second bus for communicating with the one or more ECUs; means for indicating the error to the one or more ECUs via at least one of the first bus, the second bus, or a PMIC in response to detecting the error, wherein the PMIC is configured to supply power to the main domain or the safety domain; and means for performing one or more actions in response to detecting the error.

Certain aspects of the present disclosure provide a non-transitory computer-readable medium comprising computer-executable instructions that, when executed by one or more processors of a processing system, cause the processing system to: detect an error associated with a SoC having a main domain and a safety domain, wherein the main domain is coupled to a first bus for communicating with one or more ECUs and wherein the safety domain is coupled to a second bus for communicating with the one or more ECUs; indicate the error to the one or more ECUs via at least one of the first bus, the second bus, or a PMIC in response to detecting the error, wherein the PMIC is configured to supply power to the main domain or the safety domain; and perform one or more actions in response to detecting the error.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be by reference to aspects, some of which are illustrated in the appended drawings. It is to be noted, however, that the appended drawings illustrate only certain aspects of this disclosure and are therefore not to be considered limiting of its scope, for the description may admit to other equally effective aspects.

FIG. 4 is a flow diagram depicting example operations for detecting and reporting an error associated with a SoC, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
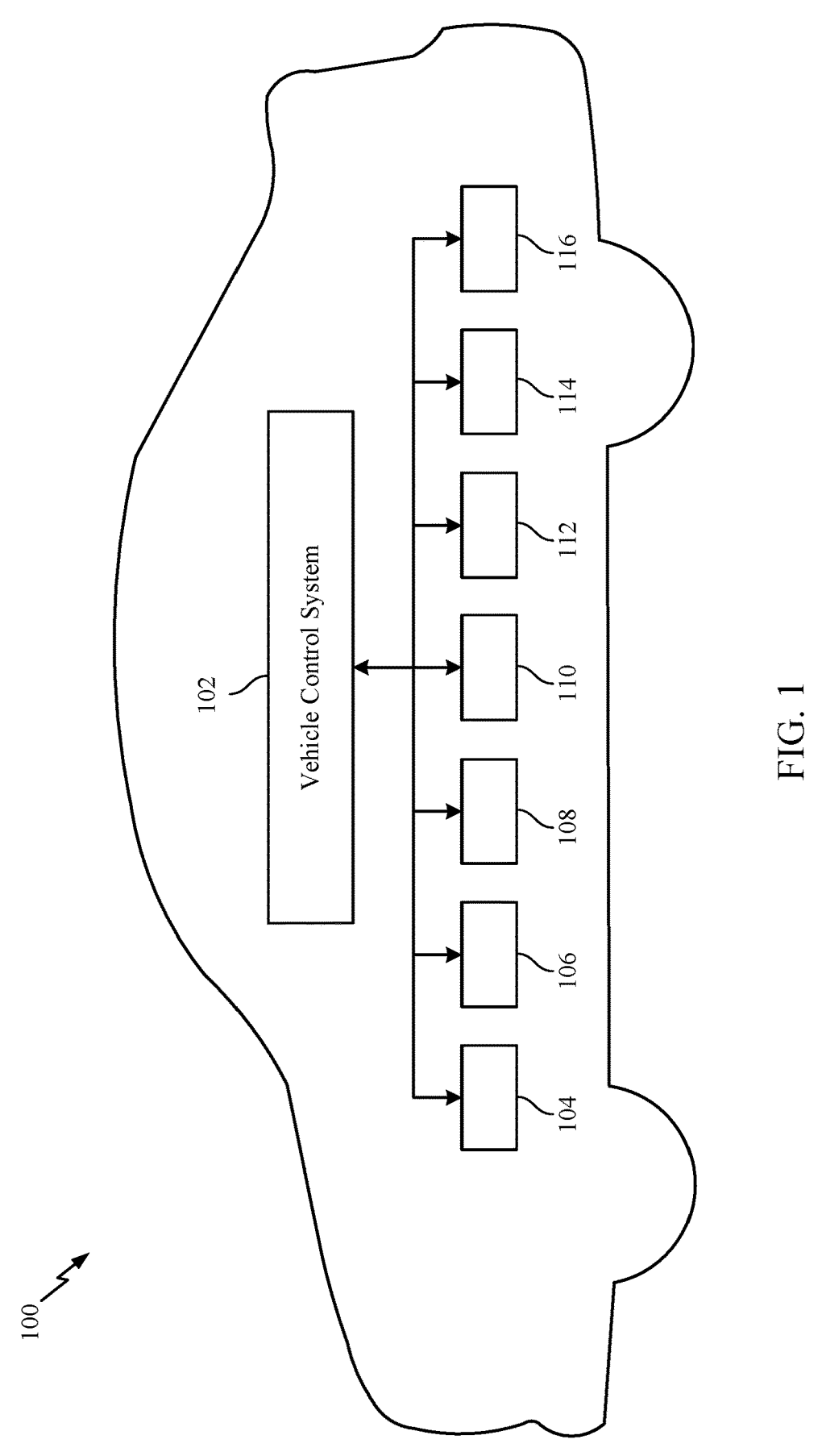
FIG. 1 is a diagram of an example vehicle with a vehicle control system, in which aspects of the present disclosure may be practiced.

Certain aspects of the present disclosure relate to methods and apparatus for safety monitoring of a vehicle control system.

Certain vehicles come with multiple features for safety, navigation, entertainment, etc., such as an advanced driver assistance system (ADAS), automated driving (AD), and/or in-vehicle infotainment (IVI). Some vehicles are able to sense and/or communicate with other vehicles and/or objects on the road, which allows for improvement in predictive safety features and AD. IVI is no longer just for entertainment purposes and may ideally work hand-in-hand with safety features, including an ADAS, especially as some vehicles are equipped with AD capabilities. As the automotive industry is transitioning to AD vehicles, ADASs are merging with IVI. Merging ADAS and IVI will improve drive safety and improve the overall driving experience. Stated differently, as the driving experience becomes autonomous, there is an increased demand for both passenger safety and entertainment.

In certain vehicle control systems, a system-on-a-chip (SoC) may be used to control an ADAS, AD, and/or IVI. In some cases, a microcontroller unit (MCU) may be used to communicate between a SoC and an electronic control unit (ECU) in the vehicle control system. For example, the SoC may have been added to the vehicle control system, which included the MCU and ECU, to provide certain ADAS, AD, and/or IVI features. In certain cases, the MCU may perform safety monitoring functions with respect to the SoC. For example, the MCU may monitor for errors that occur at the SoC and notify the ECU when an error is detected. The MCU may act as a watchdog timer for the SoC when the SoC becomes unresponsive or suspends an operation. The MCU may monitor dedicated functional safety (FuSa) errors and warning signals from the SoC. The MCU may monitor catastrophic error signals from the SoC (e.g., extreme thermal excursion). The MCU may monitor functional safety error signals from a power management integrated circuit (PMIC) that provides power to the SoC. The MCU may monitor certain other functional signals from the SoC and/or PMIC.

Aspects of the present disclosure provide methods and apparatus for safety monitoring of a vehicle control system using a SoC. For example, the SoC may have multiple buses for communicating with an ECU, where the buses may provide redundant interfaces to communicate with the ECU. For certain aspects, the buses may carry heartbeat signals or challenge-responses to the ECU to indicate whether the SoC is unresponsive or suspending an operation. In certain aspects, a PMIC, which supplies power to the SoC, may monitor error signals from the SoC, and the PMIC may notify the ECU when an error is detected. The PMIC may shut down the SoC, or may otherwise output a control signal that leads to shutting down the SoC, in response to detecting the error.

The methods and apparatus for safety monitoring described herein provide various advantages. The methods and apparatus described herein may reduce the cost and complexity of a vehicle control system, for example, by eliminating an intermediary MCU between a SoC-based control system and an ECU.

Example Vehicle Control System

FIG. 1 is a block diagram of an example vehicle 100 including a vehicle control system 102 and various sensors suitable for controlling certain systems, such as an ADAS, an AD, and/or an IVI. The vehicle 100 may refer to a means of carrying or transporting something (e.g., a person and/or cargo). In some aspects, the vehicle 100 may represent a motor vehicle, such as a car, van, truck, semi-trailer truck, motorcycle, motorbike, moped, electric bicycle, etc. The vehicle 100 may be a series production road vehicle having safety-related systems that include one or more electrical and/or electronic systems, as further described herein. The vehicle 100 may use an internal combustion engine, an electric motor, or a hybrid propulsion system (e.g., a combination of an engine and an electric motor) for propulsion. In some cases, the vehicle 100 may have one or more electrical and/or electronic systems that comply with certain functional safety standards, such as ISO 26262 as provided by the International Organization for Standardization (ISO).

Figure 2:
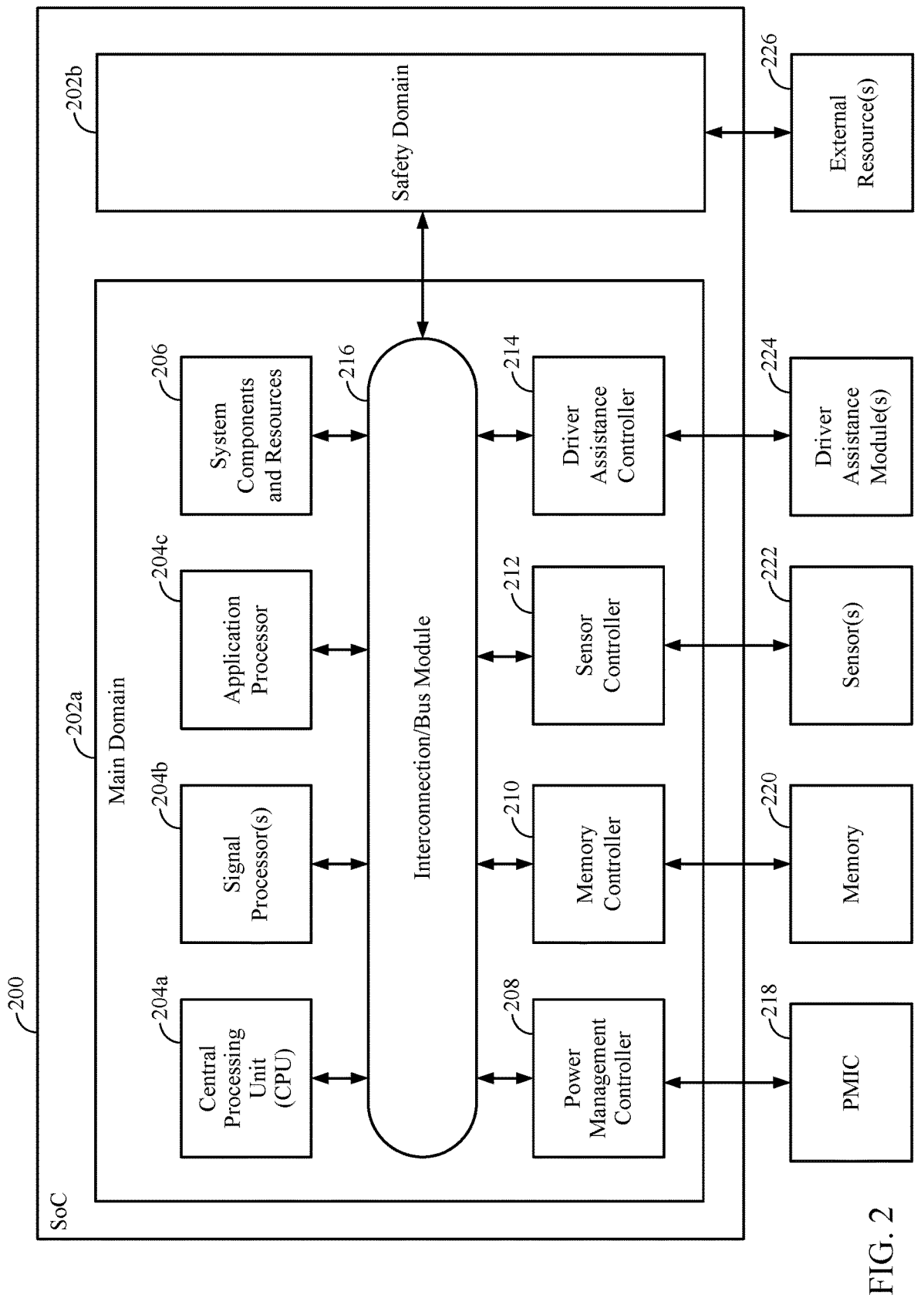
FIG. 2 is a block diagram of example components and interconnections in a SoC, in which aspects of the present disclosure may be practiced.
Figure 3:
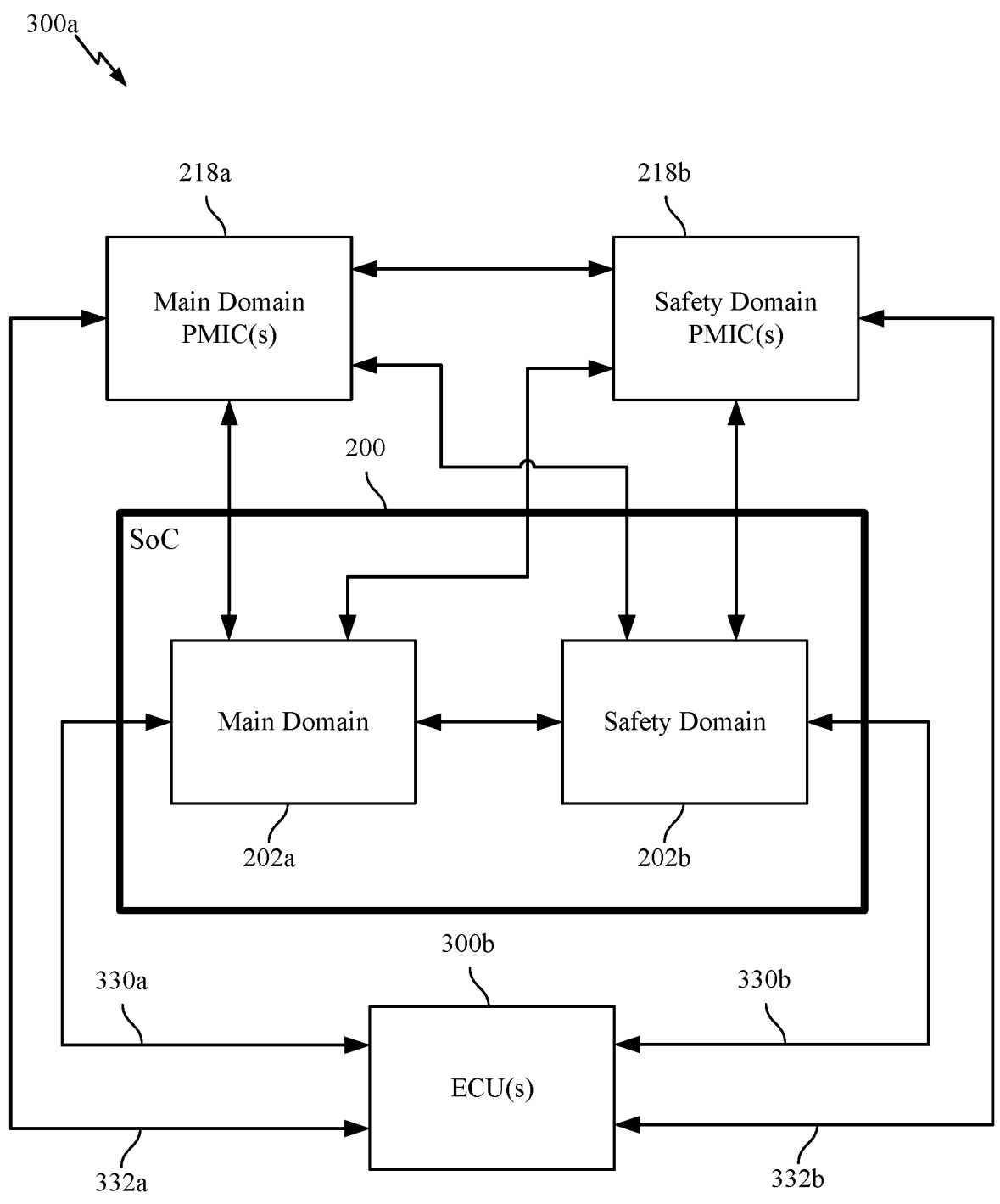
FIG. 3 is a block diagram of an example SoC-based electronic control unit (ECU) in communication with one or more other ECUs, in accordance with certain aspects of the present disclosure.

The vehicle 100 may include a vehicle control system 102, which may include one or more computing devices having SoCs (e.g., one or more ECUs) as further described herein with respect to FIGS. 2 and 3. The vehicle control system 102 may be coupled to a variety of vehicle systems and subsystems, such as an environmental system 104 (e.g., an air conditioning and/or heating system), a navigation system 106, a communications and/or infotainment system 108, a power control system 110, a drivetrain control system 112, a driver assistance and/or automated driving control system 114, and/or a variety of sensors 116. Each vehicle system or subsystem may communicate with one or more other systems (and/or subsystem(s)) via one or more communication links, which may include wired communication links (e.g., a Controller Area Network (CAN) protocol compliant bus, Universal Serial Bus (USB) connection, Ethernet connection, universal asynchronous receiver-transmitter (UART), etc.) and/or wireless communication links (e.g., a Wi-Fi® link, Bluetooth® link, ZigBee® link, ANT+® link, etc.).

The vehicle control system 102 may perform certain operations associated with any of the vehicle systems and subsystems. For example, the vehicle control system 102 may control or initiate the power-on and/or shutdown sequence for any of the vehicle systems and subsystems. The vehicle control system 102 may monitor for errors associated with any of the vehicle systems and subsystems, and in some cases, the vehicle control system 102 may store the errors for vehicle diagnostics. In response to any errors detected, the vehicle control system 102 may perform certain actions, such as shutting down the affected system or transferring some of the affected operations to be performed at a different vehicle system. The vehicle control system 102 may monitor the power levels supplied to any of the vehicle systems and subsystems and ensure that the power levels supplied satisfy the operating specifications for any of the vehicle systems and subsystems.

The environmental system 104 may control the cooling and/or heating systems associated with the vehicle 100. For example, the vehicle 100 may have an air conditioning system, a heating system, heated or cooled seat(s), and/or a heated steering wheel, and the environmental system 104 may adjust the temperature according to user (or default) settings for the respective cooling and/or heating components. The navigation system 106 may show the vehicle's location on a map and provide navigation information, such as directions to a destination, via a display and/or a speaker (neither shown).

The communications and/or infotainment system 108 may allow the user to access various information (e.g., navigation information, interior or exterior environmental information, ADAS information, etc.), applications, and/or entertainment or media content, such as music and/or videos. The communications and/or infotainment system 108 may allow the user to update or access settings associated with a variety of systems, such as the environmental system 104, the navigation system 106, ADAS, vehicle settings, etc. The communications and/or infotainment system 108 may allow the user and/or vehicle 100 to wirelessly communicate via an integrated modem of the vehicle or via the user's wireless communication device (e.g., a smartphone or tablet).

The power control system 110 may control the components that output power to move the vehicle, such as an internal combustion engine (e.g., adjusting the air-fuel ratio, boost pressure, valve timing, etc.), an electric power system (e.g., controlling regenerative braking, battery power output, battery charging, battery cooling, etc.), and/or a hybrid power system (e.g., controlling regenerative braking, switching between battery power and engine power, battery charging, battery cooling, etc.). The drivetrain control system 112 may control the various components of the vehicle 100 that deliver power to the drive wheels. For example, the drivetrain control system 112 may control gear shifting in an automatic transmission. For a four-wheel drive vehicle, the drivetrain control system 112 may control the power ratio applied to the front and rear drive wheels.

The driver assistance and/or automated driving control system 114 may control various driver assistance features and functions, such as adaptive cruise control, automated lane detection, lane departure warning, automated steering, automated braking, and automated collision avoidance. The driver assistance and/or automated driving control system 114 may control automated driving at various levels of automation, such as any of the Society of Automotive Engineers (SAE) levels 1 through 5.

The variety of sensors 116 coupled to the vehicle control system 102 may include a speedometer, a wheel speed sensor, a torquemeter, a turbine speed sensor, a variable reluctance sensor, a sonar system, a radar system, an air-fuel ratio meter, a water-in-fuel sensor, an oxygen sensor, a crankshaft position sensor, a curb feeler, a temperature sensor, a Hall effect sensor, a manifold absolute pressure sensor, various fluid sensors (e.g., engine coolant sensor, transmission fluid sensor, etc.), a tire-pressure monitoring sensor, a mass airflow sensor, a speed sensor, a blind spot monitoring sensor, a parking sensor, cameras, microphones, accelerometers, compasses, a global navigation satellite system (GNSS) receiver (e.g., a global positioning system (GPS) receiver or a Galileo receiver), and other similar sensors for monitoring physical or environmental conditions in and around the vehicle.

The aforementioned systems are presented merely as examples, and vehicles may include one or more additional systems that are not illustrated for clarity. Additional systems may include systems related to additional other functions of the vehicular system, including instrumentation, airbags, cruise control, other engine systems, stability control parking systems, tire pressure monitoring, antilock braking, active suspension, battery level and/or management, and a variety of other systems.

Example System-On-A-Chip

As used herein, the term "system-on-a-chip" (SoC) generally refers to an integrated electronic device comprising one or more integrated circuit (IC) dies (e.g., chiplets), which combines multiple electronic components (e.g., processors and/or memory) on a single substrate or in a single package. A single SoC may contain circuitry for digital, analog, mixed-signal, and/or radio-frequency functions. A single SoC may also include any number of general purpose and/or specialized processors (digital signal processors, modem processors, video processors, etc.), memory blocks (e.g., ROM, RAM, DRAM, flash, etc.), and resources (e.g., timers, voltage regulators, oscillators, etc.). A SoC may also include software for controlling the integrated resources and processors, as well as for controlling peripheral devices.

FIG. 2 is a block diagram of example components and interconnections in a SoC 200 suitable for implementing various aspects of the present disclosure. The SoC 200 may include multiple processing domains having, for example, at least one main domain 202a and at least one safety domain 202b (also referred to as a "safety island (SAIL)"). In the case of multiple main (or safety) domains, the main (or safety) domains may be similar to one another. For ease of description and illustration, the remainder of the disclosure may refer to a main domain 202a and a safety domain 202b, but the reader is to understand that there may be more than one main domain and/or more than one safety domain.

The main domain 202a may be configured to support (or be capable of performing) vehicle operations (e.g., driver assistance and/or automated driving operations, features, etc.) up to a specific automotive safety integrity level (ASIL), and the safety domain 202b may be configured to support (or be capable of performing) vehicle operations up to a lower, the same, or a higher ASIL than the main domain 202a. For example, the main domain 202a may be configured to support (or be capable of performing) vehicle operations up to an ASIL B, and the safety domain 202b may be configured to support vehicle operations up to an ASIL D. In some cases, the main domain 202a may be configured to support (or be capable of performing) vehicle operations up to an ASIL A, B, C, or D, and the safety domain 202b may be configured to support vehicle operations up to a different ASIL than the main domain 202a. In certain cases, the main domain 202a and the safety domain 202b may be configured to support (or be capable of performing) vehicle operations at the same ASIL (e.g., ASIL D). The main domain 202a and the safety domain 202b may be configured to support (or be capable of performing) vehicle operations at different ASILs.

The ASILs may be defined in a specific safety standard, such as ISO 26262. For example, the ASILs may provide a risk classification scheme for certain electrical and electronic systems of road vehicles. ISO 26262 provides four ASILs including ASIL A, ASIL B, ASIL C, and ASIL D. ASIL D is the highest classification and corresponds to the highest level of safety measures for avoiding an unreasonable residual risk, and ASIL A is the lowest classification and corresponds to the lowest level of safety measures.

In certain aspects, the SoC 200 may be included in a computing device (e.g., an ECU) in a vehicle control system. The SoC 200 may control any of the systems described herein with respect FIG. 1. For example, the SoC 200 may be configured to control an ADAS/AD system, such as the driver assistance and/or automated driving control system 114 described herein with respect to FIG. 1. In certain aspects, the SoC 200 may be in communication with other ECU(s) in a vehicle control system, and the SoC 200 and/or a PMIC 218 may report errors associated with the SoC 200 to the other ECU(s), as further described herein with respect to FIG. 3. For example, the main domain 202a may control the environmental system, the infotainment system, and driver assistance features up to a certain ASIL, and the safety domain 202b may control driver assistance features up to a certain ASIL, which may typically be higher than the main domain 202a.

The main domain 202a and/or safety domain 202b may include a number of heterogeneous processors 204a-c (collectively referred to herein as "processors 204"), such as a central processing unit (CPU) 204a, signal processor(s) 204b (e.g., a digital signal processor, an image signal processor, a neural network signal processor, etc.), and/or an application processor 204c. Each processor 204 may include one or more cores, and each processor/core may perform operations independent of the other processors/cores. Each processor 204 may be part of a subsystem (not shown) including one or more processors, caches, etc. configured to handle certain types of tasks or computations. It should be noted that the main domain 202a and/or safety domain 202b may include additional processors (not shown) or may include fewer processors (not shown). The main domain 202a and/or safety domain 202b may include other processors (e.g., a graphics processing unit (GPU), a vision processing unit, etc.) in addition to or instead of those illustrated.

The main domain 202a and/or safety domain 202b may include system components and resources 206 for performing certain specialized operations, such as analog-to-digital conversions and/or wireless data transmissions. The system components and resources 206 may include components such as voltage regulators, oscillators, phase-locked loops (PLLs), modems, peripheral bridges, data controllers, system controllers, access ports, timers, and other similar components used to support the processors and software clients running on the SoC 200. The system components and resources 206 may include circuitry for interfacing with peripheral devices, such as cameras, electronic displays, wireless communication devices, external memory chips, etc.

The main domain 202a and/or safety domain 202b may further include a power management controller 208, a memory controller 210 (e.g., a dynamic random access memory (DRAM) memory controller and/or a non-volatile memory controller), a sensor controller 212, and/or a driver assistance controller 214. The main domain 202a and/or safety domain 202b may also include an input/output (TO) module (not shown) for communicating with resources external to the SoC, such as a clock and a voltage regulator, each of which may be shared by two or more of the internal SoC components. The IO module may include a general purpose IO (GPIO) interface, for example. In certain aspects, each of the main domain 202a and the safety domain 202b may have a separate clock and power supply to facilitate independent operability.

The processors 204 of the main domain 202a may be interconnected to the system components and resources 206, the power management controller 208, the memory controller 210, the sensor controller 212, the driver assistance controller 214, other system components, and/or the safety domain 202b via an interconnection/bus module 216, which may include an array of reconfigurable logic gates and/or implement a bus architecture (e.g., CoreConnect, advanced microcontroller bus architecture (AMBA), etc.). Communications may be provided by advanced interconnects, such as high performance networks-on-chip (NoCs).

The interconnection/bus module 216 may include or provide a bus mastering system configured to grant SoC components (e.g., processors, peripherals, etc.) exclusive control of the bus (e.g., to transfer data) for a set duration, number of operations, number of bytes, etc. In certain aspects, the interconnection/bus module 216 may include a direct memory access (DMA) controller (not shown) that enables components connected to the interconnection/bus module 216 to operate as a master component and initiate memory transactions. The interconnection/bus module 216 may implement an arbitration scheme to prevent multiple master components from attempting to drive the bus simultaneously.

The power management controller 208 may manage the power supplied to the main domain 202a from a PMIC 218, which may be representative of one or more PMIC(s). In some cases, the power management controller 208 may report errors associated with the main domain 202a and/or safety domain 202b to the PMIC 218, as further described herein. The power management and error monitoring control may be separate and independent between the main domain 202a and the safety domain 202b.

The memory controller 210 may be a specialized hardware module configured to manage the flow of data to and from a memory 220. The memory controller 210 may include logic for interfacing with the memory 220, such as selecting a row and column in a cell array of the memory 220 corresponding to a memory location, reading or writing data to the memory location, etc. The memory 220 may be an on-chip component (e.g., on the substrate, die, integrated chip, etc.) of the SoC 200, or alternatively (as shown) an off-chip component.

The sensor controller 212 may manage the sensor data received from various sensors 222, such as the sensors 116. The sensor controller 212 may include circuitry for interfacing with the sensors 222. For example, the sensor controller 212 may receive sensor data from a tire pressure monitoring system and/or a radar sensor used for adaptive cruise control.

The driver assistance controller 214 may control certain driver assistance functions via a driver assistance module 224 (e.g., one or more actuators, relays, switches, etc.). For example, the driver assistance controller 214 may control the adaptive cruise control by controlling actuators coupled to the engine and/or braking system. In some cases, the driver assistance controller 214 may perform automated steering by controlling actuators attached to the steering system. It will be appreciated that the driver assistance controller 214 is merely an example, and the main domain 202a and/or the safety domain 202b may include a controller that interfaces with automated driving components in addition to or instead of the driver assistance controller 214.

The SoC 200 may also include additional hardware and/or software components that are suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, temperature, etc.), cameras, compasses, GPS receivers, communications circuitry (e.g., Bluetooth®, wireless local area network (WLAN), Long Term Evolution (LTE), Fifth Generation New Radio (5G NR), etc.), and other well-known components (e.g., accelerometer, etc.) of modern electronic devices.

Each of the processing domains may operate independently of the other domains. In some cases, each of the processing domains may be coupled to separate and independent external resources, such as a PMIC, memory, sensor (s), and driver assistance module(s). A particular external resource may be designed in accordance with an ASIL corresponding to the particular ASIL associated with the main domain 202a and/or the safety domain 202b to which the external resource is coupled. For example, the PMIC 218 may have the same ASIL as the main domain 202a, and the PMIC that provides power to the safety domain 202b may have the same ASIL as the safety domain 202b. The safety domain 202b may include the same or different processing resources and components as the main domain 202a as described herein with respect to the main domain 202a. For example, the safety domain 202b may include the processors 204, the system components and resources 206, the power management controller 208, the memory controller 210, the sensor controller 212, and the driver assistance controller 214. The safety domain 202b may be coupled to certain external resource(s) 226, which may be representative of a PMIC, memory, sensors, and/or driver assistance module, for example, as described herein with respect to the main domain 202a.

In addition to the SoC 200 discussed above, various aspects may be implemented in a wide variety of computing systems, which may include a single processor, multiple processors, multicore processors, or any combination thereof. Various aspects described herein may also be implemented in systems that employ more than one SoC. For example, a SoC-based ECU may include multiple SoCs (e.g., SoCs 200) configured to monitor the safety of a vehicle control system (e.g., vehicle control system 102). In these examples, each of the multiple SoC(s) may include different numbers of main domains and/or safety domains.

Example Safety Monitoring of SoC

FIG. 3 is a block diagram of an example SoC-based ECU 300a in communication with one or more other ECUs 300b, for example, for safety monitoring. In this example, the ECU 300a and the other ECU(s) 300b may operate in a vehicle control system and/or any vehicle system or subsystem, as described herein with respect to FIG. 1. The ECU 300a may perform some vehicle control operations (e.g., infotainment, environmental, ADAS, etc.), and the other ECU(s) 300b may perform some vehicle control operations (e.g., system wide controls, engine controls, drivetrain controls, other ADAS features, etc.). As an example, the ECU 300a may be an ADAS ECU. The ECU 300a may include the SoC 200 and corresponding external resources as described herein with respect to FIG. 2. In some aspects, the other ECU(s) 300b may include a SoC-based ECU, such as the SoC 200 and corresponding external resources as described herein with respect to FIG. 2.

The main domain 202a may operate independently of the safety domain 202b with independent external resources. For example, the main domain 202a may receive power from main domain PMIC(s) 218a, and the safety domain 202b may receive power from safety domain PMIC(s) 218b, which are different from the main domain PMIC(s) 218a and may provide independent power. Such a power architecture may allow the main domain 202a to operate even while the safety domain 202b is shut down or in a low power state, or vice versa. In some cases, the safety domain 202b may be operational to monitor the main domain 202a for errors.

Any of the main domain 202a, the safety domain 202b, the main domain PMIC(s) 218a, and/or the safety domain PMIC(s) 218b may perform self-error detection, where the component may detect an error that occurs at the component. For example, the main domain 202a may detect an error that occurs at the main domain 202a. These components may also perform redundant error detection as further described herein, where the component may detect an error that occurs at another component. For example, the safety domain 202b may detect an error that occurs at the main domain 202a, or vice versa. The safety domain 202b may monitor a safety subsystem of the main domain 202a for errors. The ECU 300a may use a redundant error propagation scheme, where any errors detected within safety subsystems are routed to the main domain 202a and the safety domain 202b. For example, the safety domain PMIC(s) 218b may notify the main domain 202a of the occurrence of an error associated with the safety domain 202b or the occurrence of an error within the safety domain PMIC(s) 218b.

The main domain 202a may be in communication with the safety domain 202b, the main domain PMIC(s) 218a, and/or the safety domain PMIC(s) 218b. Any of the safety domain 202b, the main domain PMIC(s) 218a, and/or the safety domain PMIC(s) 218b may monitor for errors associated with the main domain 202a. An error associated with the main domain 202a may include an error occurring at the main domain 202a or at any of the external resources (e.g., PMIC, memory, sensors, driver assistance modules, etc.) associated with the main domain 202a. In some cases, the main domain 202a may notify the safety domain 202b, the main domain PMIC(s) 218a, and/or the safety domain PMIC(s) 218b of the occurrence of an error associated with the main domain 202a.

In certain cases, the safety domain 202b, the main domain PMIC(s) 218a, and/or the safety domain PMIC(s) 218b may detect the error associated with the main domain 202a. The safety domain 202b, the main domain PMIC(s) 218a, and/or the safety domain PMIC(s) 218b may detect if the main domain 202a has suspended operations or is unresponsive. For example, the safety domain 202b, the main domain PMIC(s) 218a, and/or the safety domain PMIC(s) 218b may detect that the main domain 202a has stopped outputting a watchdog timer or is unresponsive to a challenge in a challenge-response exchange with the main domain 202a. A watchdog timer, a heartbeat, and/or challenge-response operation may be implemented between the main domain 202a and any of the safety domain 202b, the main domain PMIC(s) 218a, and/or the safety domain PMIC(s) 218b to ensure detection of the main domain 202a getting hung, suspending an operation, or being unresponsive. As an example, the safety domain 202b may request the main domain 202a to perform a calculation and provide the safety domain 202b with the result. If the main domain 202a provides the wrong result or is unresponsive, the safety domain 202b may detect the occurrence of an error at the main domain 202a.

The safety domain 202b may be in communication with the main domain 202a, the safety domain 202b, and/or the safety domain PMIC(s) 218b. Any of the main domain 202a and the safety domain PMIC(s) 218b may monitor for errors associated with the safety domain 202b. An error associated with the safety domain 202b may include an error occurring at the safety domain 202b or at any of the external resources associated with the safety domain 202b. In some cases, the safety domain 202b may notify the main domain 202a and/or the safety domain PMIC(s) 218b of the occurrence of an error associated with the safety domain 202b (e.g., to enable the ECU 300b to take appropriate action in response). In certain cases, the main domain 202a and/or the safety domain PMIC(s) 218b may detect the error associated with the safety domain 202b, for example, based on a watchdog operation and/or challenge-response operation.

The main domain 202a and the safety domain 202b may be in communication with the other ECU(s) 300b via separate buses 330a, 330b (collectively referred to herein as "buses 330"). The buses 330 may include a wired communication link (e.g., a CAN bus, a USB connection, an Ethernet connection, etc.) and/or a wireless communication link (e.g., a Wi-Fi® link, Bluetooth® link, ZigBee® link, ANT+® link, etc.). The buses 330 may provide redundant communication paths to the other ECU(s) 300b. Error information associated with the SoC 200 may be propagated via the first bus 330a from the main domain 202a to the other ECU(s) 300b, where error information associated with the SoC 200 may include an error occurring at the main domain 202a, the safety domain 202b, or at any of the external resources associated with the main domain 202a and/or the safety domain 202b. Error information associated with the SoC 200 may be propagated via the second bus 330b from the safety domain 202b to the other ECU(s) 300b.

In some cases, the main domain 202a and/or safety domain 202b may notify the other ECU(s) 300b of the occurrence of an error associated with the main domain and/or the safety domain 202b via the buses 330. In certain cases, the other ECU(s) 300b may detect the error associated with the main domain 202a and/or the safety domain 202b via the buses 330, for example, based on a watchdog operation and/or a challenge-response operation.

The main domain PMIC(s) and/or the safety domain PMIC(s) 218b may be in communication with the other ECU(s) 300b via communication links 332a, 332b (collectively referred to herein as "communication links 332"), such as a bus or one or more input/output (I/O) interfaces (e.g., I/O pins). The safety domain PMIC(s) 218b may be in communication with the main domain PMIC(s) 218a. Power-on and/or shutdown sequencing signals may be received at the main domain PMIC(s) 218a and/or the safety domain PMIC(s) 218b from the other ECU(s) 300b. The main domain PMIC(s) 218a and/or the safety domain PMIC(s) 218b may obtain a power-on instruction and/or a shutdown instruction from the other ECU(s) 300b. In certain cases, the main domain PMIC(s) 218a and/or the safety domain PMIC(s) 218b may receive, from the other ECU(s) 300b, an indication to perform a fast shutdown, for example, due to a sudden loss of power from an external power supply. Such an indication may be routed to a dedicated control pin of the main domain PMIC(s) 218a and/or the safety domain PMIC(s) 218b. Input supply monitoring for the PMIC(s) 218a, 218b may be performed externally either through an ASIL-rated pre-regulator or some other entity (e.g., the other ECU(s) 300b). The input supply to the PMIC(s) 218a, 218b may be ensured to be within the specifications associated with the PMIC(s) 218a, 218b.

In some cases, the safety domain PMIC(s) 218b may indicate to the main domain PMIC(s) 218a to power on or shut down the main domain 202a in response to the instruction(s). The main domain PMIC(s) 218a and the safety domain PMIC(s) 218b may also power on or shut down the main domain 202a and/or the safety domain 202b in response to the instruction(s).

The safety domain PMIC(s) 218b may receive an indication of an error associated with the SoC 200 from the main domain 202a, the safety domain 202b, and/or the main domain PMIC(s) 218a. The safety domain PMIC(s) 218b may notify the other ECU(s) 300b of the occurrence of an error associated with the main domain 202a, the main domain PMIC(s) 218a, and/or the safety domain 202b via the communication link 332b. In some cases, the other ECU(s) 300b may detect the occurrence of an error associated with the main domain 202a, the main domain PMIC(s) 218a, and/or the safety domain 202b via the communication link 332b, for example, based on a watchdog operation and/or a challenge-response operation.

In response to detecting an error associated with the main domain 202a and/or the safety domain 202b, the other ECU(s) 300b may be notified of the error by any of the main domain 202a, the safety domain 202b, and/or the safety domain PMIC(s) 218b. The other ECU(s) 300b may take corrective action based on the error. For example, the other ECU(s) 300b may instruct the SoC 200 to shut down any of the main domain 202a and the safety domain 202b, and the other ECU(s) 300b may operate the vehicle without the operations performed by the ECU 300a or taking over all or some of the operations performed by the ECU 300a. In response to detecting the error, the other ECU(s) 300b may operate according to a specific safety policy, for example, designed by the original equipment manufacturer (OEM) of the vehicle. In certain aspects, when the SoC 200 is unresponsive to commands, the ECU(s) 300b may drive shutdown of the SoC 200 by sending forceful shutdown (power-off) commands to the main domain PMIC(s) 218a and/or safety domain PMIC(s) 218b.

If the SoC 200 has a functional safety error or warning, the SoC 200 may notify the safety domain PMIC(s) 218b of the error via at least one error pin (e.g., at least one pin of a general purpose IO (GPIO)) routed from the SoC 200 to the safety domain PMIC(s) 218b). The error pin(s) are capable of communicating errors very quickly, without software intervention. In certain aspects, a communication bus may be used in addition or as an alternative to the error pin(s) for more detailed functional safety error or warning information communication. In response to detecting such an error, the SoC 200 may indicate, to the main domain PMIC(s) 218a and/or the safety domain PMIC(s) 218b, to shut down the SoC 200. In response to detecting such an error, the SoC 200 may notify the other ECU(s) 300 of the functional safety error or warning associated with the SoC 200 via any of the buses 330. In certain aspects, the main domain PMIC(s) 218a and/or the safety domain PMIC(s) 218b may also inform the ECU(s) 300 of the functional safety error and the subsequent action of shutting down the SoC 200.

In some cases, if the SoC 200 has a functional safety (FuSa) error or warning, the SoC 200 may notify the main domain PMIC(s) 218a of the error via error pins routed from the SoC 200 to at least two main domain PMIC(s) 218a. As the main domain 202a may use two or more PMICs, a primary PMIC and a secondary PMIC could be used for error monitoring. ASIL decomposition may be applied to achieve highest ASIL for error reporting through the error pins from the SoC 200 to the main domain PMIC(s) 218a. The SoC 200 may request the main domain PMIC(s) 218a and the safety domain PMIC(s) 218b to shut down the SoC 200.

A FuSa error or warning may include an error that can jeopardize the safety of future operations at a component, such as the main domain 202a or the safety domain 202b. The safety systems of the SoC 200 may monitor FuSa errors and/or FuSa warnings. A FuSa error may include an electrical and/or electronic fault detected through hardware or software safety mechanisms that leads to an uncorrectable error within safety systems of the SoC 200. The detected error can lead to failure and/or violation of a particular safety goal. A FuSa warning may include an electrical and/or electronic fault detected through hardware or software safety mechanisms within the safety systems of the SoC 200. The detected faults associated with a FuSa warning may be correctable faults or uncorrectable faults. A correctable fault associated with a FuSa warning can be detected, reported, and corrected by the safety systems of the vehicle (e.g., the other ECU(s) 300b) and/or the SoC 200. For example, a correctable fault may be a memory error handled by error correction code, such as a 1-bit error. An uncorrectable fault associated with a FuSa warning may be a known fault that can be handled by a safety policy of the OEM. For example, in response to detecting an uncorrectable fault, the safety policy may dictate providing a notification of the warning, such as a SoC temperature excursion warning (e.g., triggered by an on-die temperature of the SoC exceeding a warning threshold, but not the error threshold) or a SoC voltage excursion warning (e.g., triggered by an on-die voltage of the SoC exceeding a warning threshold, but not the error threshold). In certain aspects, the FuSa error or warning may include a systematic fault associated with software or hardware, such as a software bug or hardware design bug.

For example, a functional safety error or warning may include a miscalculation or faulty determination performed at the main domain 202a and/or the safety domain 202b, corrupted or malfunctioning memory coupled to the main domain 202a and/or the safety domain 202b (e.g., due to a memory bit being flipped), or an inability for the main domain 202a and/or the safety domain 202b to communicate with a sensor and/or a control device (e.g., an actuator, relay, switch, etc.). As another example, a functional safety error may include a malfunction occurring at a sensor (e.g., corrupted data for the measurements) or a control device (e.g., a stuck actuator or non-operational relay).

The safety domain 202b may perform watchdog operations and/or challenge-response operations for the main domain 202a to detect if the main domain 202a suspends an operation or becomes hung in an operation or unresponsive. In response to detecting such an error, the safety domain 202b may notify the other ECU(s) 300b of the error associated with the main domain 202a. In some cases, the safety domain 202b may indicate, to the main domain PMIC(s) 218a, to shut down the main domain 202a, and the safety domain 202b may continue operating without the main domain 202a. The safety domain 202b may be functionally isolated from the main domain 202a to allow the safety domain 202b to operate independently of the main domain 202a. The safety domain PMIC(s) 218b and/or the other ECU(s) 300b may perform watchdog operations and/or challenge-response operations for the main domain 202a and/or the safety domain 202b to detect if the main domain 202a and/or the safety domain 202b suspends an operation or becomes hung in an operation or unresponsive.

If the main domain PMIC(s) 218a has a functional safety error or warning, the main domain PMIC(s) 218a may notify the safety domain 202b and/or the safety domain PMIC(s) 218b, for example, via at least one error pin routed from the main domain PMIC(s) 218a to the safety domain 202b, the safety domain PMIC(s) 218b, and/or the ECU(s) 300b. The communication of the functional safety error or warning from the main domain PMIC(s) 218b to the safety domain 202b, the safety domain PMIC(s) 218b, and/or the ECU(s) 300b may occur through one or more communication bus interfaces (e.g., Serial Peripheral Interface (SPI), UART, Inter-Integrated Circuit (I²C), or the like) in addition to the error pin(s), or instead of the error pin(s) (e.g., via a communication interface from the PMIC(s) 218b. In response to detecting such an error, the main domain PMIC(s) 218a may drive the shutdown of the main domain 202a. A SoC-level shutdown may be performed with the safety domain PMIC(s) 218b driving the shutdown of the safety domain 202b. In certain aspects, the safety domain 202b may continue to operate to provide a degraded mode of operation without the main domain 202a. For certain aspects, the safety domain 202b may request the safety domain PMIC(s) 218b to shut down the safety domain 202b.

If the safety domain PMIC(s) 218b has a functional safety error or warning, the safety domain PMIC(s) 218b may notify the main domain 202a via at least one error pin routed from the safety domain PMIC(s) 218b to the main domain 202a. In certain aspects, the communication of the functional safety error or warning from the safety domain PMIC(s) 218b to the main domain 202a may occur through a communication bus interface (e.g., SPI, UART, I²C, or the like) in addition or as an alternative to the error pin(s). Similarly, in certain aspects, a suitable communication interface may relay the error in the safety domain PMIC(s) 218b to the ECU(s) 300b. In response to detecting such an error, the main domain 202a may notify the other ECU(s) 300b of the error via the first bus 330a. The main domain 202a may indicate, to the main domain PMIC(s) 218a, to shut down the main domain 202a. The safety domain PMIC(s) 218b may shut down the safety domain 202b. In some cases, the main domain 202a may indicate, to the safety domain PMIC(s) 218b, to shut down the safety domain 202b.

If the main domain 202a has a functional safety error or warning, the main domain 202a may notify the safety domain PMIC(s) 218b of the error via an error pin routed from the SoC 200 to the safety domain PMIC(s) 218b. In response to detecting such an error, the safety domain PMIC(s) 218b may instruct the main domain PMIC(s) 218a to shut down the main domain 202a, and in some cases, the safety domain PMIC(s) 218b may notify the other ECU(s) 300b of the error via the communication link 332b. In response to detecting such an error, the SoC 200 may indicate to the main domain PMIC(s) 218a to shut down the main domain 202a. In response to detecting such an error, the safety domain 202b may notify the other ECU(s) 300b of the error via the second bus 330b. In some cases, the safety domain 202b may indicate, to the main domain PMIC(s) 218a, to shut down the main domain 202a, and the safety domain 202b may continue operating without the main domain 202a being operational. In certain cases, the safety domain 202b may continue operating without sending the shutdown instruction to the main domain PMIC(s) 218a.

If the safety domain 202b has a functional safety error or warning, the safety domain 202b may notify the safety domain PMIC(s) 218b via an error pin routed from the SoC 200 to the safety domain PMIC(s) 218b. In response to detecting such an error, the safety domain 202b may instruct the main domain 202a to shut down. In response to detecting such an error, the main domain 202a may notify the other ECU(s) 300b of the error associated with the safety domain 202b. The safety domain 202b may indicate, to the safety domain PMIC(s) 218b, to shut down the safety domain 202b. In some cases, the main domain 202a may not be able to continue operating without the safety domain 202b being operational.

The SoC 200 may be configured to communicate with the other ECU(s) 300b via at least one of the first bus 330a, the second bus 330b, the main domain PMIC(s) 218a, and/or the safety domain PMIC(s) 218b without a vehicle interface processor (e.g., a microcontroller unit (MCU), also referred to as a "safety MCU" or external safety monitor) coupled between the safety domain 202b (or PMIC(s) 218) and the other ECU(s) 300b. The direct communication links between the SoC 200 (and the PMIC(s) 218) and other ECU(s) 300b may reduce the complexity and cost associated with the ECU 300a. In certain aspects, the direct communication links between the SoC 200 and other ECU(s) 300b may provide redundant communication paths allowing the SoC 200 and other ECU(s) 300b to communicate with each other, for example, in cases where one or more of the buses 330 (and/or one or more of the communication links 332) cannot be used for communications, or when certain safety subsystems within the SoC 200 or the PMIC(s) 218 detect a functional safety error.

FIG. 4 is a flow diagram depicting example operations 400 for operating a vehicle (e.g., the vehicle 100). The operations 400 may be performed, for example, by a SoC (e.g., the SoC 200) or a SoC-based ECU (e.g., the SoC-based ECU 300a of FIG. 3), hereinafter referred to as a "SoC/ECU."

The operations 400 may optionally begin, at block 402, where the SoC/ECU may detect an error (or a fault) associated with the SoC (e.g., the SoC 200) having a main domain (e.g., the main domain 202a) and a safety domain (e.g., the safety domain 202b). For example, the main domain, the safety domain, and/or any of the PMICs may detect the error. The main domain may be coupled to a first bus (e.g., the first bus 330a) for communicating with one or more ECUs (e.g., the other ECU(s) 300b), and the safety domain may be coupled to a second bus (e.g., the second bus 330b) for communicating with the one or more ECUs.

At block 404, the SoC/ECU may indicate the error to the one or more ECUs via at least one of the first bus, the second bus, or a PMIC (e.g., the PMIC(s) 218a, 218b) in response to detecting the error. The PMIC may be configured to supply power to the main domain or the safety domain. As an example, the SoC/ECU may indicate the error via the first bus in response to the error being associated with the safety domain, and the SoC/ECU may indicate the error via the second bus in response to the error being associated with the main domain.

At block 406, the SoC/ECU may perform one or more actions in response to detecting the error. For example, the SoC/ECU may shut down the component (e.g., the main domain 202a) that encountered the error. In certain cases, the SoC/ECU may allow the component to operate in a degraded or sub-operational state. For example, suppose there is an error associated with the environmental system controlled by the main domain 202a, the SoC/ECU may allow the main domain 202a to continue performing other operations without the environmental system. For certain aspects, the SoC/ECU may transfer operations associated with the affected component to another component. For example, the SoC/ECU may allow the safety domain 202b to perform some of the affected operations performed by the main domain 202a.

If the error includes a functional safety error or warning associated with the SoC, the SoC/ECU may shut down the SoC at block 406. The SoC/ECU may output, from the SoC, an indication of the error to the PMIC. To indicate the error, the SoC/ECU may indicate the error to the one or more ECUs via the PMIC in response to the PMIC obtaining the indication of the error from the SoC. The PMIC may be in communication with the one or more ECUs, and the PMIC may be coupled to the main domain of the SoC or the safety domain of the SoC. To shut down the SoC, the SoC/ECU may output, to a first PMIC (e.g., the main domain PMIC(s) 218a) and a second PMIC (e.g., the safety domain PMIC(s) 218b), an indication to shut down the SoC. The first PMIC may be coupled to the main domain of the SoC, the second PMIC may be coupled to the safety domain of the SoC, and the PMIC includes at least one of the first PMIC or the second PMIC. The SoC/ECU may power off the SoC via the first PMIC and the second PMIC in response to the indication to shut down the SoC.

In certain aspects, when the error includes a functional safety error or warning associated with the SoC, the SoC/ECU may cause the SoC to be rebooted via the first PMIC and the second PMIC. This reboot may include a complete power-on cycle, safety initialization, and self-tests of the SoC (including the main domain and safety domain, as well as the associated PMICs) before the SoC is operationalized again to execute safety functions. In this manner, the SoC may be booted again after safely shutting down the SoC, for example, in cases where the error is not permanent in nature and disappears after the reboot.

In some cases, the error may include the SoC being unresponsive or the SoC suspending an operation or being hung on an operation. In such cases, to detect the error, the SoC/ECU may use the safety domain of the SoC to detect that the error occurred at the main domain of the SoC, for example, using watchdog operations and/or challenge-response operations. In certain aspects, the PMIC (e.g., the safety domain PMIC(s) 218b) may be coupled to the safety domain; and to detect the error, the SoC/ECU may use the PMIC to detect that the error occurred at the safety domain of the SoC, for example, using watchdog operations and/or challenge-response operations.

In certain aspects, the error may include a functional safety error or warning associated with a first PMIC (e.g., the main domain PMIC(s) 218a or the safety domain PMIC(s) 218b). In cases where the first PMIC supplies power to the main domain, the SoC/ECU may output, to the safety domain of the SoC or to a second PMIC (e.g., the safety domain PMIC(s) 218b) from the first PMIC, an indication of the error at the first PMIC. The first PMIC may be coupled to the main domain of the SoC, the second PMIC may be coupled to the safety domain of the SoC, and the PMIC includes at least one of the first PMIC or the second PMIC. To perform the one or more actions, the SoC/ECU may shut down at least the main domain of the SoC. In some cases, the SoC/ECU may operate the safety domain of the SoC while the main domain of the SoC is shut down. In cases where the first PMIC supplies power to the safety domain, the SoC/ECU may output, to the main domain of the SoC or the one or more ECUs from the first PMIC, an indication of the error at the first PMIC. The first PMIC may be coupled to the safety domain of the SoC. To perform the one or more actions, the SoC/ECU may shut down the SoC.

For certain aspects, the error may include a functional safety error associated with the main domain of the SoC. The SoC/ECU may indicate the error via the second bus coupled to the safety domain of the SoC. The SoC/ECU may output, from the SoC, an indication of the error to the PMIC (e.g., the main domain PMIC(s) 218a). The PMIC may be coupled to the main domain of the SoC. To perform the one or more actions, the SoC/ECU may shut down at least the main domain of the SoC in response to obtaining the indication of the error at the PMIC. In some cases, the SoC/ECU may operate the safety domain of the SoC while the main domain of the SoC is shut down.

In certain aspects, the error may include the main domain of the SoC being unresponsive or the main domain suspending an operation or being hung on an operation. To detect the error, the SoC/ECU may use the safety domain of the SoC to detect that the error occurred at the main domain of the SoC. To indicate the error to the one or more ECUs, the SoC/ECU may indicate the error to the one or more ECUs via the second bus coupled to the safety domain of the SoC. To perform the one or more actions, the SoC/ECU may shut down at least the main domain of the SoC. In some cases, the SoC/ECU may operate the safety domain of the SoC while the main domain of the SoC is shut down.

For certain aspects, the error may include a functional safety error associated with the safety domain of the SoC. To indicate the error, the SoC/ECU may indicate the error to the one or more ECUs via the first bus coupled to the main domain of the SoC. In certain cases, the SoC/ECU may indicate, from the safety domain of the SoC to the main domain of the SoC, to shut down the SoC, and the SoC/ECU may shut down the SoC at block 406.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, means for detecting, means for indicating, means for performing, means for using, means for shutting down, means for powering off, means for outputting, and/or means for operating may include a SoC (e.g., the SoC 200), a main domain of the SoC (e.g., the main domain 202a), a safety domain of the SoC (e.g., the safety domain 202b), one or more PMICs (e.g., the main domain PMIC(s) 218a and/or the safety domain PMIC(s) 218b), a bus (e.g., the buses 330) coupled to the main domain and/or the safety domain, and/or a communication link (e.g., the communication links 332) coupled to the PMIC(s).

Example Aspects

Implementation examples are described in the following numbered aspects:

Aspect 1: A method of operating a vehicle, comprising: detecting an error associated with a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs; indicating the error to the one or more ECUs via at least one of the first bus, the second bus, or a power management integrated circuit (PMIC) in response to detecting the error, wherein the PMIC is configured to supply power to the main domain or the safety domain; and performing one or more actions in response to detecting the error.

Aspect 2: The method of Aspect 1, wherein indicating the error comprises: indicating the error via the first bus in response to the error being associated with the safety domain; and indicating the error via the second bus in response to the error being associated with the main domain.

Aspect 3: The method of Aspect 1 or 2, wherein: the error includes a functional safety error associated with the SoC; and performing the one or more actions comprises shutting down the SoC or rebooting the SoC.

Aspect 4: The method of Aspect 3, further comprising: outputting, from the SoC, an indication of the error to the PMIC, wherein the PMIC is coupled to the main domain of the SoC or the safety domain of the SoC, and wherein indicating the error comprises indicating the error to the one or more ECUs via the PMIC in response to the PMIC obtaining the indication of the error from the SoC, wherein the PMIC is in communication with the one or more ECUs.

Aspect 5: The method of Aspect 3 or 4, wherein shutting down the SoC comprises: outputting, to a first PMIC and a second PMIC, an indication to shut down the SoC, wherein the first PMIC is coupled to the main domain of the SoC, wherein the second PMIC is coupled to the safety domain of the SoC, and wherein the PMIC includes at least one of the first PMIC or the second PMIC; and powering off the SoC via the first PMIC and the second PMIC in response to the indication to shut down the SoC.

Aspect 6: The method according to any of Aspects 1-5, wherein the error includes the SoC being unresponsive or the SoC suspending an operation.

Aspect 7: The method of Aspect 6, wherein detecting the error comprises using the safety domain of the SoC to detect that the error occurred at the main domain of the SoC.

Aspect 8: The method of Aspect 6, wherein the PMIC is coupled to the safety domain and wherein detecting the error comprises using the PMIC to detect that the error occurred at the safety domain of the SoC.

Aspect 9: The method according to any of Aspects 1-8, wherein the error includes a functional safety error associated with a first PMIC.

Aspect 10: The method of Aspect 9, further comprising: outputting, to the safety domain of the SoC or to a second PMIC from the first PMIC, an indication of the error at the first PMIC, wherein the first PMIC is coupled to the main domain of the SoC, wherein the second PMIC is coupled to the safety domain of the SoC, wherein the PMIC includes at least one of the first PMIC or the second PMIC, and wherein performing the one or more actions comprises shutting down at least the main domain of the SoC.

Aspect 11: The method of Aspect 10, wherein performing the one or more actions comprises operating the safety domain of the SoC while the main domain of the SoC is shutdown.

Aspect 12: The method of Aspect 9, further comprising: outputting, to the main domain of the SoC or the one or more ECUs from the first PMIC, an indication of the error at the first PMIC, wherein the first PMIC is coupled to the safety domain of the SoC, and wherein performing the one or more actions comprises shutting down the SoC.

Aspect 13: The method according to any of Aspects 1-12, wherein the error includes a functional safety error associated with the main domain of the SoC.

Aspect 14: The method of Aspect 13, wherein indicating the error comprises indicating the error via the second bus coupled to the safety domain of the SoC.

Aspect 15: The method of Aspect 13 or 14, further comprising: outputting, from the SoC, an indication of the error to the PMIC, wherein the PMIC is coupled to the main domain of the SoC, wherein performing the one or more actions comprises shutting down at least the main domain of the SoC in response to obtaining the indication of the error at the PMIC.

Aspect 16: The method of Aspect 15, wherein performing the one or more actions comprises operating the safety domain of the SoC while the main domain of the SoC is shutdown.

Aspect 17: The method according to any of Aspects 1-16, wherein the error includes the main domain of the SoC becoming unresponsive or suspending an operation.

Aspect 18: The method of Aspect 17, wherein: detecting the error comprises using the safety domain of the SoC to detect that the error occurred at the main domain of the SoC; and indicating the error to the one or more ECUs comprises indicating the error to the one or more ECUs via the second bus coupled to the safety domain of the SoC.

Aspect 19: The method of Aspect 18, wherein performing the one or more actions comprises shutting down at least the main domain of the SoC.

Aspect 20: The method of Aspect 19, wherein performing the one or more actions comprises operating the safety domain of the SoC while the main domain of the SoC is shutdown.

Aspect 21: The method according to any of Aspects 1-20, wherein the error includes a functional safety error associated with the safety domain of the SoC.

Aspect 22: The method of Aspect 21, wherein indicating the error comprises indicating the error to the one or more ECUs via the first bus coupled to the main domain of the SoC.

Aspect 23: The method of Aspect 21 or 22, further comprising: indicating, from the safety domain of the SoC to the main domain of the SoC, to shut down the SoC, wherein performing the one or more actions comprises shutting down the SoC.

Aspect 24: An apparatus for operating a vehicle, comprising: a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs; and a power management integrated circuit (PMIC) configured to supply power to the main domain or the safety domain, wherein at least one of the SoC or the PMIC is configured to: detect an error associated with the SoC, indicate the error to the one or more ECUs via at least one of the first bus, the second bus, or the PMIC in response to detecting the error, and perform one or more actions in response to detecting the error.

Aspect 25: The apparatus of Aspect 24, wherein to indicate the error: the main domain is configured to indicate the error via the first bus in response to the error being associated with the safety domain; and the safety domain is configured to indicate the error via the second bus in response to the error being associated with the main domain.

Aspect 26: The apparatus of Aspect 24 or 25, wherein: the error includes a functional safety error associated with the SoC; and to perform the one or more actions, the PMIC is configured to shut down the SoC.

Aspect 27: The apparatus according to any of Aspects 24-26, wherein the SoC is configured to communicate with the one or more ECUs via at least one of the first bus, the second bus, or the PMIC without a vehicle interface processor coupled between the safety domain and the one or more ECUs.

Aspect 28: The apparatus according to any of Aspects 24-27, wherein the main domain is configured to support at least up to an automotive safety integrity level (ASIL) B and wherein the safety domain is configured to support up to an ASIL D.

Aspect 29: An apparatus, comprising: a memory comprising computer-executable instructions; one or more processors configured to execute the computer-executable instructions and cause the apparatus to perform a method in accordance with any of Aspects 1-23.

Aspect 30: An apparatus, comprising means for performing a method in accordance with any of Aspects 1-23.

Aspect 31: A non-transitory computer-readable medium comprising computer-executable instructions that, when executed by one or more processors of a processing system, cause the processing system to perform a method in accordance with any of Aspects 1-23.

Aspect 32: A computer program product embodied on a computer-readable storage medium comprising code for performing a method in accordance with any of Aspects 1-23.

Aspect 33: A non-transitory computer-readable medium comprising computer-executable instructions that, when executed by one or more processors of a processing system, cause the processing system to: detect an error associated with a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs; indicate the error to the one or more ECUs via at least one of the first bus, the second bus, or a power management integrated circuit (PMIC) in response to detecting the error, wherein the PMIC is configured to supply power to the main domain or the safety domain; and perform one or more actions in response to detecting the error.

Aspect 34: An apparatus for operating a vehicle, the apparatus comprising: means for detecting an error associated with a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs; means for indicating the error to the one or more ECUs via at least one of the first bus, the second bus, or a power management integrated circuit (PMIC) in response to detecting the error, wherein the PMIC is configured to supply power to the main domain or the safety domain;

and means for performing one or more actions in response to detecting the error.

Additional Considerations

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B and object B touches object C, then objects A and C may still be considered coupled to one another—even if objects A and C do not directly physically touch each other. For instance, a first object may be coupled to a second object even though the first object is never directly physically in contact with the second object. The terms "circuit" and "circuitry" are used broadly and intended to include both hardware implementations of electrical devices and conductors that, when connected and configured, enable the performance of the functions described in the present disclosure, without limitation as to the type of electronic circuits.

The apparatus and methods described in the detailed description are illustrated in the accompanying drawings by various blocks, modules, components, circuits, steps, processes, algorithms, etc. (collectively referred to as "elements"). These elements may be implemented using hardware, for example.

One or more of the components, steps, features, and/or functions illustrated herein may be rearranged and/or combined into a single component, step, feature, or function or embodied in several components, steps, or functions. Additional elements, components, steps, and/or functions may also be added without departing from features disclosed herein. The apparatus, devices, and/or components illustrated herein may be configured to perform one or more of the methods, features, or steps described herein.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover at least: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A method of operating a vehicle, comprising:

detecting an error associated with a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs;

indicating the error to the one or more ECUs via at least one of the first bus, the second bus, or a power management integrated circuit (PMIC) in response to detecting the error, wherein the PMIC is configured to supply power to the main domain or the safety domain, and wherein indicating the error comprises:

indicating the error via the first bus in response to the error being associated with the safety domain; and indicating the error via the second bus in response to the error being associated with the main domain; and performing one or more actions in response to detecting the error.

2. The method of claim 1, wherein:

the error includes a functional safety error associated with the SoC; and performing the one or more actions comprises shutting down the SoC or rebooting the SoC.

3. The method of claim 2, further comprising:

outputting, from the SoC, an indication of the error to the PMIC, wherein the PMIC is coupled to the main domain of the SoC or the safety domain of the SoC, and wherein indicating the error further comprises indicating the error to the one or more ECUs via the PMIC in response to the PMIC obtaining the indication of the error from the SoC, wherein the PMIC is in communication with the one or more ECUs.

4. The method of claim 2, wherein shutting down the SoC comprises:

outputting, to a first PMIC and a second PMIC, an indication to shut down the SoC, wherein the first PMIC is coupled to the main domain of the SoC, wherein the second PMIC is coupled to the safety domain of the SoC, and wherein the PMIC includes at least one of the first PMIC or the second PMIC; and powering off the SoC via the first PMIC and the second PMIC in response to the indication to shut down the SoC.

5. The method of claim 1, wherein the error includes the SoC being unresponsive or the SoC suspending an operation.

6. The method of claim 5, wherein detecting the error comprises using the safety domain of the SoC to detect that the error occurred at the main domain of the SoC.

7. The method of claim 5, wherein the PMIC is coupled to the safety domain and wherein detecting the error comprises using the PMIC to detect that the error occurred at the safety domain of the SoC.

8. The method of claim 1, wherein the error includes a functional safety error associated with a first PMIC.

9. The method of claim 8, further comprising:

outputting, to the safety domain of the SoC or to a second PMIC from the first PMIC, an indication of the error at the first PMIC, wherein the first PMIC is coupled to the main domain of the SoC, wherein the second PMIC is coupled to the safety domain of the SoC, wherein the PMIC includes at least one of the first PMIC or the second PMIC, and wherein performing the one or more actions comprises shutting down at least the main domain of the SoC.

10. The method of claim 9, wherein performing the one or more actions comprises operating the safety domain of the SoC while the main domain of the SoC is shutdown.

11. The method of claim 8, further comprising:

outputting, to the main domain of the SoC or the one or more ECUs from the first PMIC, an indication of the error at the first PMIC, wherein the first PMIC is coupled to the safety domain of the SoC, and wherein performing the one or more actions comprises shutting down the SoC.

12. The method of claim 1, wherein the error includes a functional safety error associated with the main domain of the SoC.

13. The method of claim 12, further comprising:

outputting, from the SoC, an indication of the error to the PMIC, wherein the PMIC is coupled to the main domain of the SoC, wherein performing the one or more actions comprises shutting down at least the main domain of the SoC in response to obtaining the indication of the error at the PMIC.

14. The method of claim 13, wherein performing the one or more actions comprises operating the safety domain of the SoC while the main domain of the SoC is shutdown.

15. The method of claim 1, wherein the error includes the main domain of the SoC becoming unresponsive or suspending an operation.

16. The method of claim 15, wherein detecting the error comprises using the safety domain of the SoC to detect that the error occurred at the main domain of the SoC.

17. The method of claim 16, wherein performing the one or more actions comprises shutting down at least the main domain of the SoC.

18. The method of claim 17, wherein performing the one or more actions comprises operating the safety domain of the SoC while the main domain of the SoC is shutdown.

19. The method of claim 1, wherein the error includes a functional safety error associated with the safety domain of the SoC.

20. The method of claim 19, further comprising:

indicating, from the safety domain of the SoC to the main domain of the SoC, to shut down the SoC, wherein performing the one or more actions comprises shutting down the SoC.

21. The method of claim 1, wherein the main domain is configured to support up to a different automotive safety integrity level (ASIL) than the safety domain.

22. An apparatus for operating a vehicle, comprising:

a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs; and a power management integrated circuit (PMIC) configured to supply power to the main domain or the safety domain, wherein at least one of the SoC or the PMIC is configured to:

detect an error associated with the SoC, indicate the error to the one or more ECUs via at least one of the first bus, the second bus, or the PMIC in response to detecting the error, wherein to indicate the error:

the main domain is configured to indicate the error via the first bus in response to the error being associated with the safety domain; and the safety domain is configured to indicate the error via the second bus in response to the error being associated with the main domain, and perform one or more actions in response to detecting the error.

23. The apparatus of claim 22, wherein:

the error includes a functional safety error associated with the SoC; and to perform the one or more actions, the PMIC is configured to shut down the SoC.

24. The apparatus of claim 22, wherein the SoC is configured to communicate with the one or more ECUs via at least one of the first bus, the second bus, or the PMIC without a vehicle interface processor coupled between the safety domain and the one or more ECUs.

25. The apparatus of claim 22, wherein the main domain is configured to support at least up to an automotive safety integrity level (ASIL) B and wherein the safety domain is configured to support up to an ASIL D.

26. The apparatus of claim 22, wherein the main domain is configured to support up to a different automotive safety integrity level (ASIL) than the safety domain.

27. A non-transitory computer-readable medium comprising computer-executable instructions that, when executed by one or more processors of a processing system, cause the processing system to:

detect an error associated with a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs;

indicate the error to the one or more ECUs via at least one of the first bus, the second bus, or a power management integrated circuit (PMIC) in response to detecting the error, wherein the PMIC is configured to supply power to the main domain or the safety domain, and wherein to indicate the error:

the main domain is configured to indicate the error via the first bus in response to the error being associated with the safety domain; and the safety domain is configured to indicate the error via the second bus in response to the error being associated with the main domain; and perform one or more actions in response to detecting the error.

28. The non-transitory computer-readable medium of claim 27, wherein the main domain is configured to support up to a different automotive safety integrity level (ASIL) than the safety domain.

29. An apparatus for operating a vehicle, the apparatus comprising:

means for detecting an error associated with a system-on-a-chip (SoC) having a main domain and a safety domain, wherein the main domain is coupled to a first bus for communicating with one or more electronic control units (ECUs) and wherein the safety domain is coupled to a second bus for communicating with the one or more ECUs;

means for indicating the error to the one or more ECUs via at least one of the first bus, the second bus, or a power management integrated circuit (PMIC) in response to detecting the error, wherein the PMIC is configured to supply power to the main domain or the safety domain and wherein indicating the error comprises:

indicating the error via the first bus in response to the error being associated with the safety domain; and indicating the error via the second bus in response to the error being associated with the main domain; and means for performing one or more actions in response to detecting the error.

30. The apparatus of claim 29, wherein the main domain is configured to support up to a different automotive safety integrity level (ASIL) than the safety domain.

\* \* \* \* \*